(12) United States Patent
Antolinos (10) Patent No.: US 11,609,298 B2
(45) Date of Patent: Mar. 21, 2023

(54) METHOD FOR LOCATING DATA, CONTROL SYSTEM, TRANSMITTER DEVICE

(71) Applicant: UWINLOC, Toulouse (FR)

(72) Inventor: Luc Antolinos, Blagnac (FR)

(73) Assignee: UWINLOC, Toulouse (FR)

( * ) Notice: Subject to any disclaimer, the term of this patent is extended or adjusted under 35 U.S.C. 154(b) by 80 days.

(21) Appl. No.: 17/260,416

(22) PCT Filed: Aug. 30, 2019

(86) PCT No.: PCT/EP2019/073211
§ 371 (c)(1),
(2) Date: Jan. 14, 2021

(87) PCT Pub. No.: WO2020/043877
PCT Pub. Date: Mar. 5, 2020

(65) Prior Publication Data
US 2021/0266746 A1    Aug. 26, 2021

(30) Foreign Application Priority Data

Aug. 31, 2018   (FR) ...................................... 1800921

(51) Int. Cl.
*G01S 5/02* (2010.01)
*H04W 4/029* (2018.01)
(Continued)

(52) U.S. Cl.
CPC .............. *G01S 5/02* (2013.01); *H04W 4/029* (2018.02); *H04W 4/50* (2018.02); *H04W 12/041* (2021.01);
(Continued)

(58) Field of Classification Search
CPC ..... H04W 12/106; H04W 4/50; H04W 4/029; H04W 12/041; H04W 64/00;
(Continued)

(56) References Cited

U.S. PATENT DOCUMENTS 5,751,570 A   5/1998  Stobbe et al.
8,869,305 B1  10/2014  Huang
(Continued)

FOREIGN PATENT DOCUMENTS

CN     110574414 A1 * 12/2019  .............. H04W 4/38
WO  WO 2007036940 A2 *  4/2007  ......... G06K 7/10306

OTHER PUBLICATIONS

International Search Report as issued in International Patent Application No. PCT/EP2019/073211, dated Nov. 29, 2019.

*Primary Examiner* — Meless N Zewdu
(74) *Attorney, Agent, or Firm* — Pillsbury Winthrop Shaw Pittman LLP (57) ABSTRACT

A method for controlling the integrity of at least one useful datum includes acquiring at least one UWB message coming from a transmitter by a wireless interface; demodulating the at least one UWB message and decoding of at least one useful datum; determining the position of the UWB transmitter by a reception of a plurality of messages transmitted by the transmitter and an analysis of the time-of-flight differences between these messages; associating the calculated position with the at least one useful datum.

21 Claims, 4 Drawing Sheets

(51) Int. Cl.
*H04W 4/50* (2018.01)
*H04W 12/106* (2021.01)
*H04W 12/041* (2021.01)
*H04W 60/00* (2009.01)
*H04W 64/00* (2009.01)

(52) U.S. Cl.
CPC ......... *H04W 12/106* (2021.01); *H04W 60/00* (2013.01); *H04W 64/00* (2013.01)

(58) Field of Classification Search
CPC ..... H04W 60/00; H04W 12/02; H04W 12/03; H04W 12/033; H04W 12/037; H04W 4/80; H04W 4/70; H04W 12/10; H04W 12/104; H04W 4/02; H04W 4/021; H04W 4/38; H04W 8/08; H04W 8/24; H04W 60/64; H04W 16/18; H04W 16/20; H04W 16/225; H04W 4/33; H04W 4/30; H04W 12/00; H04W 12/64; H04W 12/108; H04W 12/12; G07C 9/28; G07C 9/00; G01S 5/02; G01S 1/00; G01S 1/02; G01S 1/042; G01S 1/045; G01S 2205/02; G01S 5/015; G08G 1/0116; G08G 1/012; H03M 13/655; H01Q 5/20; H01Q 5/22; H01Q 5/25; H01Q 3/00; H01Q 23/00; H01Q 25/00; G08B 21/00; G08B 21/02; G08B 21/0272; G01C 21/106

See application file for complete search history.

(56) References Cited

U.S. PATENT DOCUMENTS

| | | |
|---|---|---|
| 2003/0174048 A1* | 9/2003 | McCorkle ................. 340/10.34 |
| 2005/0135811 A1 | 6/2005 | Lee et al. |
| 2005/0232219 A1* | 10/2005 | Aiello et al. .................. 370/348 |
| 2006/0033662 A1* | 2/2006 | Ward et al. .................... 342/465 |
| 2006/0107008 A1 | 5/2006 | Ghanem et al. |
| 2006/0256959 A1* | 11/2006 | Hymes ..................... 379/433.04 |
| 2008/0030359 A1 | 2/2008 | Smith et al. |
| 2008/0096529 A1 | 4/2008 | Zellner |
| 2008/0186231 A1 | 8/2008 | Aljadeff et al. |
| 2008/0204322 A1* | 8/2008 | Oswald et al. ............... 342/465 |
| 2012/0176272 A1 | 7/2012 | Hirata |
| 2018/0275268 A1* | 9/2018 | Reisinger et al. .... G01S 13/765 |
| 2019/0086507 A1* | 3/2019 | Zhao ........................ G01S 5/14 |

* cited by examiner

METHOD FOR LOCATING DATA, CONTROL SYSTEM, TRANSMITTER DEVICE

CROSS-REFERENCE TO RELATED APPLICATIONS

This application is the U.S. National Stage of PCT/EP2019/073211, filed Aug. 30, 2019, which in turn claims priority to French patent application number 1800921 filed Aug. 31, 2018. The content of these applications are incorporated herein by reference in their entireties.

FIELD

The field of the invention relates to that of methods and equipment enabling the location of data transmitted by an equipment for the purpose of guaranteeing the integrity thereof. The field of the invention relates to transmitter equipment comprising a UWB interface for transmitting at least one datum of which it is wished to guarantee the origin notably by the control of the position from which it is transmitted.

PRIOR ART

Solutions exist making it possible to secure the identity of a person or to control the integrity of a datum transmitted by said person during a transaction. The notion of transaction extends in the wide sense, when a third party is notably turned to in an operation aiming to obtain accesses, rights or a control of the data exchanged between different entities comprising an electronic communication module.

It may involve, for example, delivery of access to a room at the level of a door for which a user would have transmitted beforehand a request to obtain this access by means of an electronic communication device.

According to another example, the targeted case may correspond to that of a verification of a fire alert transmitted by a smoke detector of which it is wished to verify a measurement of a sensor and its position in order to validate or not an intervention.

Finally, according to another example, during a transaction in a given place, the certitude that the transaction is actually carried out from this place may suffice to authorize the transaction to a user present in this place.

At present, these situations are solutioned in order to use the position of a user to make a transaction reliable.

In this sense, the patent document U.S. Pat. No. 8,869,305 describes a solution in which a position is determined from a wireless network of WiFi type or by a Bluetooth link. The position may be exploited in an absolute or relative manner. In an absolute manner, the present solution aims to verify the local connectivity with an equipment, for example to verify that it is indeed located within a WiFi network or by means of a control of the position obtained by a GPS system. In a relative manner, it is notably the case when it is wished to verify that a user is situated, for example, near to his audio headset or his computer. A deduction may be that a user is situated or not at his work place.

As regards locating a device by its connectivity in a place, such as also described in the patent document US200080096529, a problem is that this solution is not precise and that it comprises a risk in the reliability of the control of the integrity of a datum. Indeed, the connectivity alone makes it possible to work back to the information that a user is situated in a given zone, but it does not make it possible to know precisely its location. Hence, a usurpation of identity when the location is used as password may be very dangerous. This presents a danger in the control of the integrity of the data transmitted when only the position of the equipment is used to validate a transaction.

Finally, as regards GPS location, such as described in the patent document US20060107008, the latter is also not sufficiently precise to enable wide use of a control of integrity of a datum by the position of an equipment of a user. Furthermore, the GPS position may be obtained with difficulty in a context of a partitioned, enclosed or immersed place within which the equipment may not be detected.

Furthermore, mobile solutions using GPS type satellite location generally process the data relative to the position acquired in different algorithms. Consequently, these data may be detected, captured and/or corrupted by a third party. This operation authorizes, for example, the possibility of generating a false location in order to usurp an identity.

There thus exists a need to provide a solution to the following problem: locating a datum to produce in order to ensure its integrity, that is to say to recognize the source of its origin as equipment or user. This datum location function should preferably be carried out in a reliable manner, that is to say without enabling possible falsification of the location by a third party. Moreover, the solutions should also enable an operation in a partitioned or closed environment not limiting the production of a precise position of the equipment.

SUMMARY OF THE INVENTION

According to a first aspect the invention relates to a method for controlling the integrity of at least one useful datum, said method comprising:
  Acquisition of at least one message in the UWB radio band coming from a transmitter by means of a wireless interface and a UWB demodulator;
  Decoding of at least one useful datum, designated first information;
  Determination of a position information, designated second information, of the UWB transmitter from several receptions of messages transmitted by said transmitter;
  Generation of a data pair comprising on the one hand the first information and on the other hand the second information.

According to another aspect, the invention relates to a method for controlling the integrity of at least one useful datum, characterized in that it comprises:
  Acquisition of at least one message by a plurality of beacons, the position of each beacon being known, each acquisition being carried out in the UWB radio band, each message received from each beacon coming from a transmitter by means of a wireless interface and a UWB demodulator;
  Decoding of at least one useful datum, designated first information, by each beacon;
  Determination of a position information of the UWB transmitter, designated second information, from a calculation between the different receptions of the at least one message transmitted by the transmitter and received by each beacon;
  Generation of a data pair comprising on the one hand the first information and on the other hand the second information;
  Verification of the integrity of said first information from an operation of controlling the second information;
  Transmission of a message for the activation of a service.

An advantage of the invention is to draw benefit from the location of the transmission of a UWB message to certify the integrity of a given information. An advantage of the UWB radio band is to enable a very precise location of the transmission source generating the UWB messages. Thus, it becomes possible to increase the security of the control of the messages in various transactions by corroborating the position of the transmission of the data with an expected position.

The transmission of the message may advantageously be carried out destined for a third party server to activate said service.

According to an embodiment, the operation for controlling the determined position comprises:
- A control of the coherency between each message received by a plurality of beacons (30), the coherency corresponding to a difference in arrival times of the messages below a predefined threshold and/or;
- A comparison between the position determined by trilateration and an expected position and/or;
- A control of similarity of at least one pattern of a data sequence of the first information.

According to an embodiment, the acquisition comprises a reception of a sequence of radio pulses, defining UWB messages, by a plurality of beacons, each beacon being located at a predefined position.

An advantage is to cover a given zone in which transactions are liable to intervene. An interest is to generate an unfalsifiable location information. The latter may for example comprise a position vector of which the components are measurements of arrival times of a signal or times-of-flight. These data are virtually unfalsifiable given that the regeneration of such a vector would necessitate knowledge of the reception data in each receiver. In particular, it would be necessary to usurp the signal at the level of each receiver while conserving a synchronization between the usurpations which is better than a duration of the order of the nanosecond while preventing the original signal from arriving at these same receivers.

In addition, according to an embodiment, the invention makes it possible to generate a code, for example, turning in the date at each transmission. In these conditions, it becomes impossible to guess the message in advance and thus to carry out a playback attack of a message already received, better known by the name "replay attack" or "playback attack".

The third party wishing to usurp a dated message would then have to conduct an attack simultaneously at the level of each receiver while being on the premises. He would then have to know the radio architecture and the layout of the reception beacons.

According to an embodiment, the position information of the transmitter is determined by a method for estimating:
- the arrival times of the UWB messages in order to deduce therefrom the time-of-flight differences of the latter and/or;
- the arrival powers of the UWB messages and/or;
- the arrival frequencies of the UWB messages,
- at the level of said reception beacons.

An advantage is to obtain an enhanced precision of the position of the transmitter for example by combining different locating techniques.

According to an embodiment, when the differences in arrival times of the messages are estimated, the location of the transmitter being deduced from a trilateration calculation between the arrival times of the different UWB messages.

An advantage is to obtain a precise and reliable position with a short processing time.

According to an embodiment, at least one UWB message received comprises an identifier of the transmitter. An advantage is to secure the control of integrity by verifying the identification of the transmitter device and its location.

In the case of a smoke detector, the identifier may be transmitted in clear at the UWB radio level, that is to say without enciphering. In other cases, the identification may be deduced from the place of reception of the transmitted UWB messages. In this latter case, the transmission of the identification of the smoke detector may be optional since by construction the UWB messages received determine the detector that transmits the frames. Generally, the identifiers of the smoke detectors are known and their position in space may be referenced and stored in a remote memory. When the position calculated by the reception beacons is false and does not correspond to the expected theoretical position, then the reconstructed message comprising the position from the UWB messages is a false message.

According to an embodiment, a step of extraction of a data sequence from each message received by the beacons is carried out, each extraction withdrawing the data at the same positions of each received message, each extracted data sequence forming an ad hoc message identifier.

According to an embodiment, the calculated position information and the useful datum, and optionally the identifier of the transmitter, are associated by the generation of a unique key. An advantage is to transfer secure data to a control server having the capacities to control the integrity of the useful datum. This solution avoids for example communicating in clear the position of a user accessing a given service. Thus, a first calculation is carried out at the level of the calculator performing the position calculation in order to generate an intermediate datum not restituting the entirety of the value of the position.

The generation of a data pair comprising the first useful data information and the second position information may be interpreted as an association of data. This association may be carried out, for example, by an operation combining the first and the second information to generate a third party value or instead a saving of the two items of information linked by a unique key.

According to an embodiment, the association between the calculated position information and the useful datum comprises the generation of a code resulting from an operation:
- of encoding of the data by an encoding algorithm;
- of interleaving, a permutation of data or an operation making it possible to generate a data field comprising the data bits of the position information and the data bits originating from the useful data, and/or;
- of enciphering of the data with one other by means of an enciphering key.

An advantage is not to communicate in clear the position of the user.

According to an embodiment, the method comprises the transmission of a summary message to a remote server, the summary message comprising:
- the useful datum and the calculated position information, this information being able to be encoded in different fields of the summary message and/or;
- the useful datum and the calculated position information, said calculated position being encrypted in the summary message and/or;
- a unique key making it possible to decipher the position information enciphered in a field of the summary message and/or;
- an identifier of the UWB transmitter having transmitted the message and/or;

an identifier of an equipment on which a tag is arranged, said equipment and the tag forming a transmitter device.

An advantage is to communicate to a remote server data making it possible to verify the integrity of useful data.

According to an embodiment, the method comprises the following preliminary steps:
collection of an amount of energy by radio channel by a transmitter device comprising a radio tag, said radio tag comprising a radio reception module for receiving a stream of radio waves;
transmission of at least one message in the UWB band, said message encoding a useful datum, said transmission being generated from an amount of energy collected.

According to another aspect, the invention relates to a control system comprising:
At least one reception beacon comprising:
A first wireless interface configured to receive signals in the UWB band;
A radio module making it possible to process the signals received in such a way as to time stamp the reception of a plurality of messages received and to baseband demodulate at least one useful datum;
A calculator for determining a position of the space from the analysis of a plurality of properties originating from the receptions of messages coming from at least one transmitter, said properties originating from the receptions being correlated in such a way as to determine a position information of a transmitter;
A memory for saving at least one value associating on the one hand a calculated position information of the space and on the other hand at least one useful datum.

According to an embodiment, the system comprises a second calculator for verifying the integrity of said first information from an operation of controlling the second information.

According to an embodiment, the control system of the invention comprises a plurality of beacons, for example at least two beacons and preferentially three beacons or more.

An advantage is to have available a complete system making it possible to secure transactions in a given place. Thus, a place may be equipped with beacons aiming to cover a given zone. The position information generated by a plurality of beacons is difficult to falsify given that the data used to find the location depend on properties of the radio signal and the position of the beacons.

The second calculator may for example be integrated in a second server.

According to an embodiment, in the system of the invention:
each beacon comprises a component for time stamping the UWB messages received;
the calculator determines the differences in times-of-flight originating from a plurality of receptions of messages coming from at least one transmitter in order to determine the position information of the transmitter.

An advantage is to obtain a system providing a precise position. The more precise the determined position, the more the system of the invention makes it possible to offer a service for enhanced control of the integrity of the useful data.

According to an embodiment, the control system further comprises a second remote server, said remote server comprising an interface for receiving a summary message generated by the calculator and comprising calculation means to:

decode and control the position information and;
generate a message aiming to enable or prohibit access to a service to a given equipment,
the second server further comprising an interface for transmitting said message to the given equipment.

An advantage is to secure any type of transaction from the moment that a useful datum of the transaction may be associated with a position during the transaction.

According to another aspect, the invention relates to a transmitter device comprising:
An equipment capable of generating at least one useful datum in a predefined context and of transferring said useful datum by means of a first interface;
A radio tag comprising a second interface for receiving said at least one useful datum, said radio tag comprising a UWB modulator in the UWB band for transmitting a signal comprising said at least one useful datum.

An advantage is to transform an existing equipment into an equipment being able to ensure the integrity of data transmitted during transactions with third party equipment.

According to an embodiment, the transmitter device further comprises:
A radio reception module for receiving a stream of radio waves;
A rectifier for converting the spectral power received by the radio reception module into an electric voltage or current;
An electrical accumulator;
An energy capacities management module for triggering the transmission of a message in the UWB band from the UWB modulator.
An interest is to provide an energy autonomous device which is supplied by a source of radio energy installed in a place covering the transmitter devices capable of circulating therein.

According to an embodiment, the transmitter device comprises an electrical supply link between the radio tag and the equipment, the energy capacities management module comprising a function for waking-up the equipment ensuring the delivery of a sufficient amount of energy to activate at least one measurement of at least one sensor of said equipment and the transmission of at least one datum relative to said measurement to the tag.

According to an embodiment, the energy capacities management module comprises a function for optimizing the collected energy to ensure at least:
a wake-up of the equipment,
a measurement of a sensor of the equipment and the transfer of the data from the equipment to the tag, and
a transmission of a UWB message by the radio tag.

According to an embodiment, the radio energy capacities management module comprises a self-learning function aiming to evaluate the amount of energy necessary for the equipment $EQ_1$ enabling it to accomplish a sequence of actions comprising at least the measurement of a physical parameter and its transmission to the tag from a data link.

According to an embodiment, the radio tag comprises a module for managing the surveillance of the availability of at least one function ensured by the equipment $EQ_1$, said module controlling at regular intervals the reception of a signal or a datum presenting an indicator of activity of said equipment $EQ_1$.

According to another aspect, the invention relates to a system for controlling the integrity of at least one useful datum produced by a device of the invention and decoded by a system of the invention.

An advantage is to define a solution offering the possibility of generating useful data $DATA_1$ in an autonomous manner. The use of UWB frames with pulses of short durations to obtain a precise location as well as the limitation of energy of the device of the invention usually involve a transmission in "clear" of raw data originating from a sensor of the equipment $EQ_1$. Indeed, in such a solution the encoding of data or the expenditure of any energy not necessary for the transmission may prove to be superfluous. The control of integrity on reception of the data from the position data is thus particularly interesting for such location and data transmission solutions.

Indeed, if the data are transmitted without encoding or without enciphering, the solution of the invention has the advantage of controlling that the data transmitted by the UWB transmitter are indeed the data measured by the equipment $EQ_1$ associated with said UWB transmitter. Thus, the invention makes it possible to offer a solution for transmitting and receiving a useful datum of an equipment $EQ_1$ and a position of a transmitter associated with said equipment $EQ_1$ in an autonomous manner while securing the control of the integrity of the datum received.

BRIEF DESCRIPTION OF THE FIGURES

Other characteristics and advantages of the invention will become clear on reading the detailed description that follows, with reference to the appended figures, which illustrate.

DESCRIPTION

In the remainder of the description a radio tag comprising a UWB modulator designates a radio tag transmitting signals in the UWB band. The tag 20 may also be called "UWB radio tag" or "UWB tag". It is designated by the index 20 in the figures. In its widest interpretation, a UWB radio tag designates an electronic support comprising at least a modulator and a UWB antenna. The latter may be electronically integrated in other electronic stages of an equipment $EQ_1$.

In the remainder of the description, the radio tag transmits messages $M_1$ in the form of sequences of ultra-wide band radio pulses, called "UWB messages". Such UWB messages, formed by a sequence of radio impulses, are also designated "Ultra Wide Band-Impulse Radio" or UWB-IR.

Figure 2:
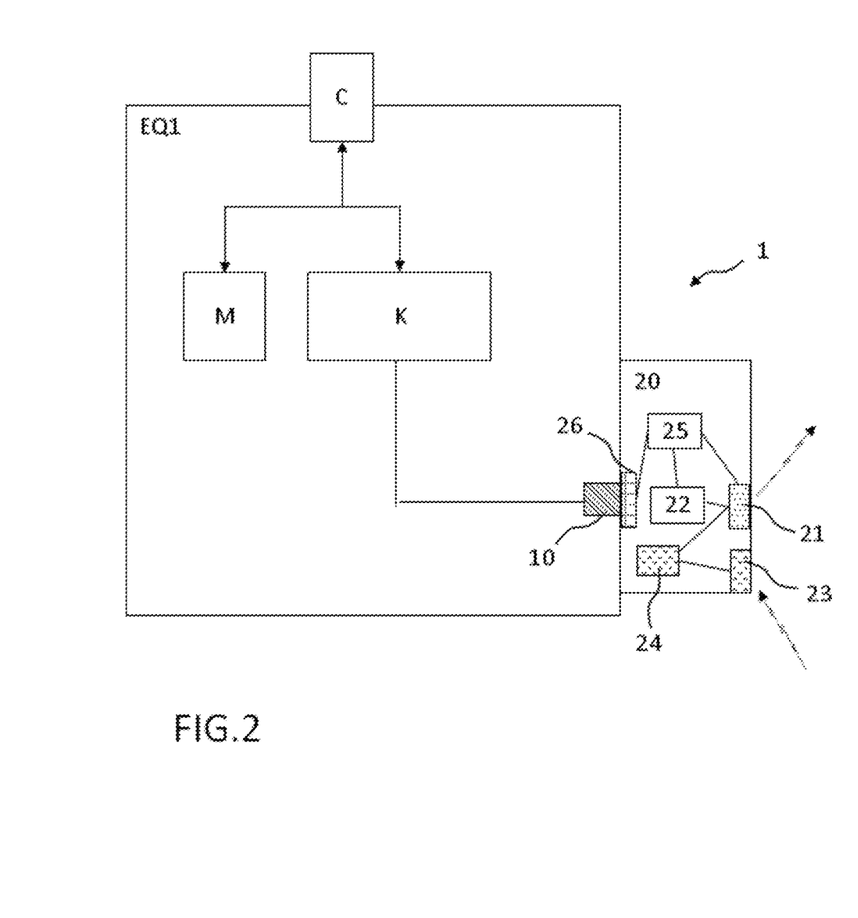
FIG. 2: a transmitter equipment according to an embodiment of the invention.

In the remainder of the description, the transmitter device 1 of the invention comprising a UWB tag 20 may be assimilated with the tag 20 for the description of transmission functions. Thus, for the reader's convenience, the transmission of a message $M_1$ by a UWB radio tag 20 will be evoked to designate also the transmission of a message $M_1$ by a transmitter device 1 comprising the functional bricks and the components making it possible to carry out the transmissions of messages $M_1$ in the UWB band. The notion of "tag" is thus quite relative in so far as the transmitter device 1 of the invention carries out the transmission functions while integrating the necessary characteristics of a UWB radio tag to carry out these transmissions. To this end, FIG. 2 represents a transmitter device 1 according to an embodiment comprising a tag 20 arranged such that it is physically linked to the equipment $EQ_1$, said equipment $EQ_1$ generating data $DATA_1$ of which the integrity must be secured from the method of the invention.

In the remainder of the description, the method of the invention aims to secure the integrity of at least one datum $DATA_1$ transmitted by a transmitter device 1 or more specifically by an equipment $EQ_1$ associated with a UWB radio tag. The datum is called decoded datum or useful datum. It may comprise a minimal information corresponding to a "0" or "1" datum bit and is not limited in octet size. According to an embodiment, the useful data $DATA_1$ comprise a plurality of octets.

Figure 1:
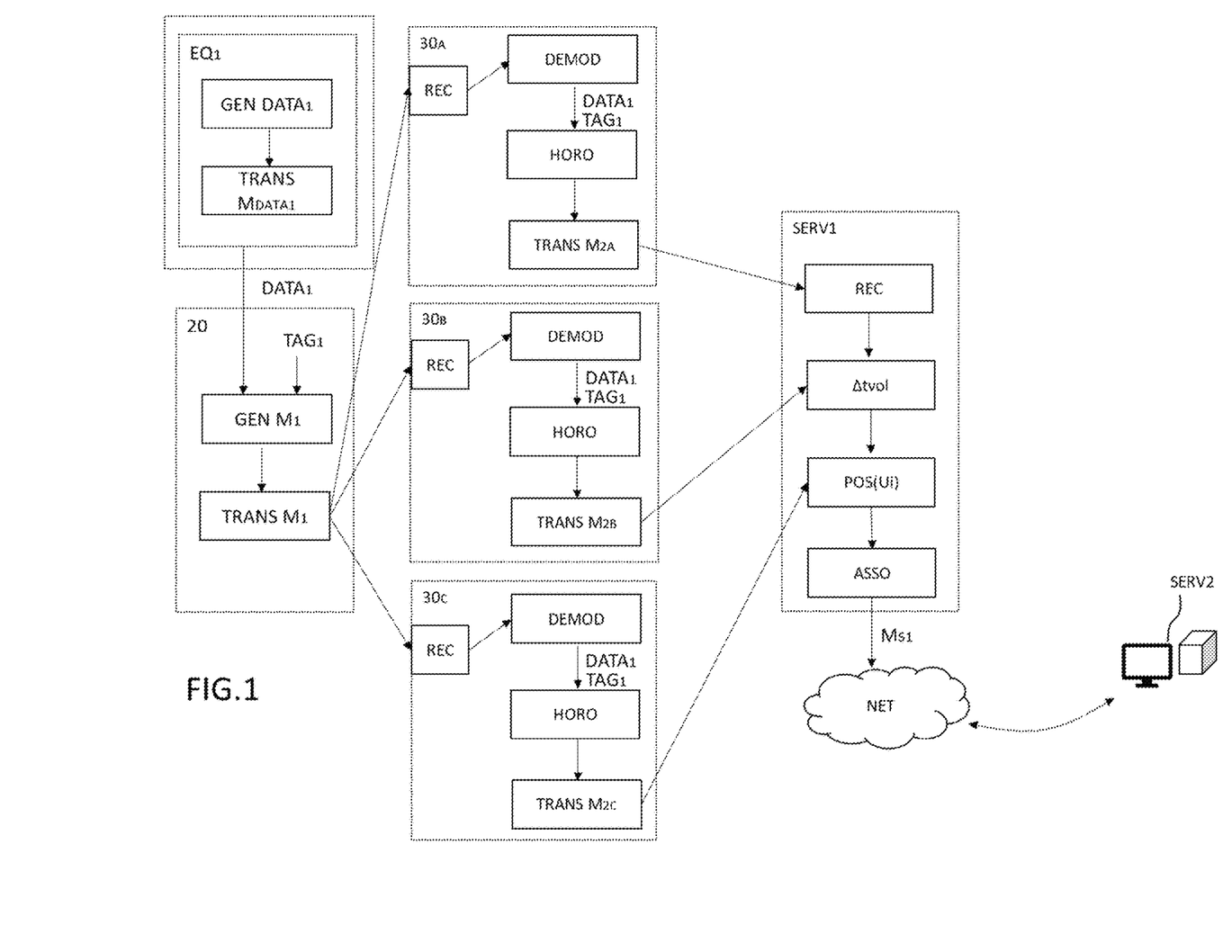
FIG. 1: different steps of the method of the invention implemented according to an embodiment of the method of the invention.

FIG. 1 represents an embodiment of the method of the invention. This illustration represents the exchanges between different entities, namely an equipment $EQ_1$, a tag 20, reception beacons 30, a server $SERV_1$ or an equipment centralizing the different messages $M_1$ in order to generate a location information and a second server $SERV_2$, as well as the different messages transmitted between them. According to an embodiment, the equipment $EQ_1$ and the UWB tag only form a single and same equipment comprising a modulator and a UWB antenna.

An equipment $EQ_1$ comprises a calculator for generating useful data $DATA_1$. These data may originate from a memory and may correspond, for example, to a stored identifier, a public key or a value of a parameter. These useful data $DATA_1$ may also originate from a sensor collecting data. In this latter case, the data $DATA_1$ may be raw data, filtered data or processed data or instead a calculated result originating from data collected with other parameters. Finally, these data may result from operations on data coming from a database, from a server and acquired by a wired or wireless link of the equipment $EQ_1$.

According to an exemplary embodiment, the method comprises a step of generation $GEN\_DATA_1$ of data $DATA_1$ for example by means of a calculator. The generated data are transmitted to the UWB tag 20. To this end, a step $TRANS\_M_{DATA1}$ makes it possible to communicate the data $DATA_1$ to the tag 20. These data $DATA_1$ may be transmitted via a physical interface or a wireless interface according to the different embodiments of the transmitter device 1.

The UWB tag 20 then receives the data $DATA_1$. The method thus comprises a step of reception (not represented) of data coming from the equipment $EQ_1$. According to an embodiment, the data that will be modulated in a message $M_1$ comprise data $DATA_1$ received from the equipment $EQ_1$ and data coming from the tag 20 such as data $TAG_1$ which here encode an identifier of the tag 20 or the transmitter device 1 when the tag 20 is electronically or physically integrated in the equipment $EQ_1$.

When the data $DATA_1$ to transmit by an equipment $EQ_1$ are too voluminous to be encoded in a single message $M_1$ transmitted by the tag 20, the method comprises a step aiming to segment the data $DATA_1$ into a plurality of packets $DATA_{11}, DATA_{12}, \ldots DATA_{1k}, DATA_{1N}, k \in [1;N]$. A data encoding module may be configured in such a way as to optimize the encoding of the data $DATA_1$ within a plurality of messages $M_1$. Data redundancy, interleaving or encryption functions may be implemented so as to generate messages $M_1$ responding to a predefined configuration.

The method of the invention further comprises a step of generation GEN_$M_1$ of a message $M_1$ in order to encode and modulate the data DATA$_1$ and possibly the data TAG$_1$ in at least one UWB message $M_1$. The message(s) $M_1$ are then next transmitted to at least one reception beacon 30, this step is noted TRANS_$M_1$. The message $M_1$ is transmitted thanks to an antenna of the tag 20.

According to an embodiment, the UWB messages transmitted by a same tag 20 may all be of identical sizes. Certain fields are predefined, for example, the field comprising the identifier of the tag 20: TAG$_1$ or the transmitter device 1. The information bits included in this field may thus be identical. The field corresponding to the data DATA$_1$ may be fixed or variable according to the envisaged embodiments.

According to an embodiment, the method of the invention comprises a step of reception of a plurality of messages $M_1$ comprising at least one useful datum DATA$_1$.

Figure 5:
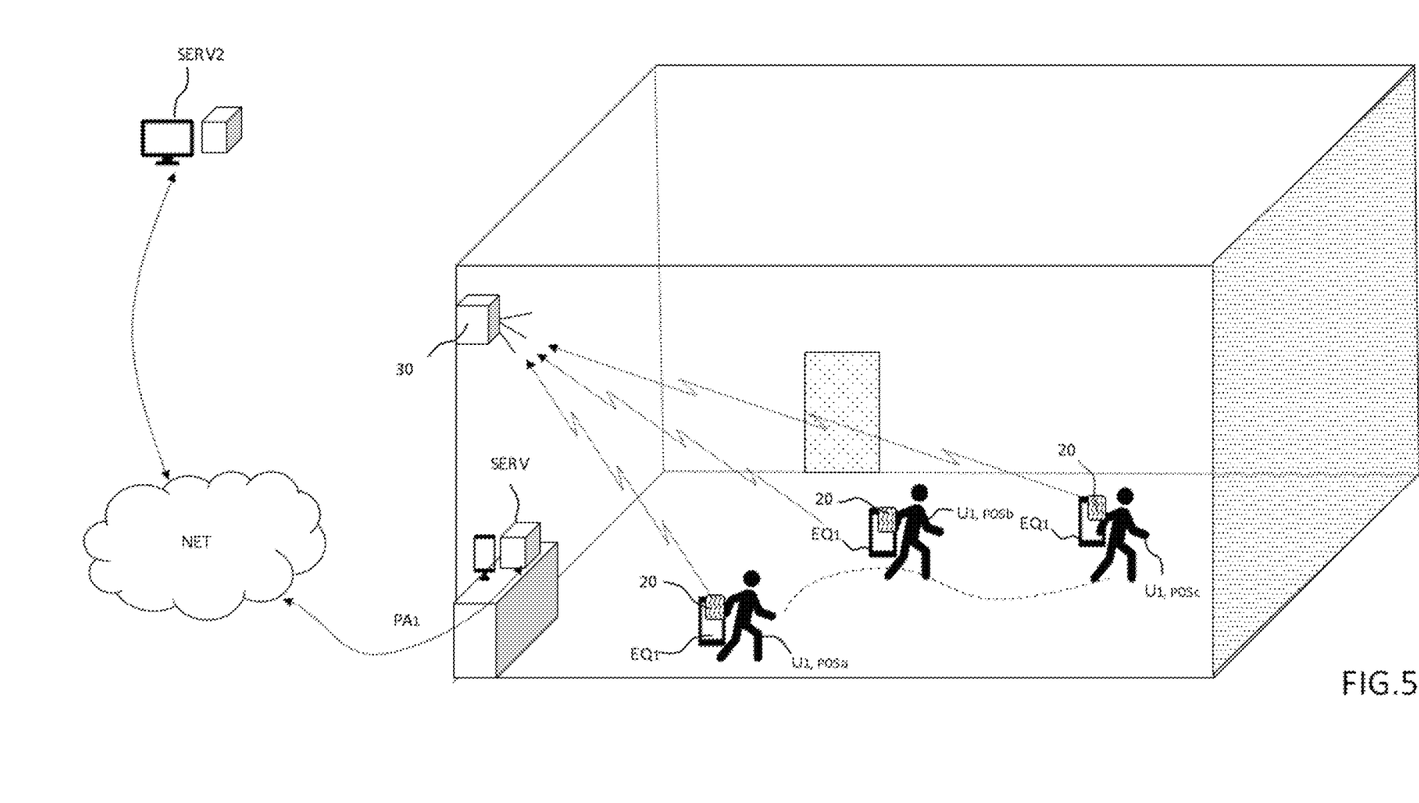
FIG. 5: a perspective view of a place in which is arranged a receiver unit for receiving messages coming from a moving transmitter device according to an embodiment of the invention.

According to a first embodiment, the plurality of receptions is carried out sequentially by a single beacon 30. In this embodiment, messages $M_1$ are transmitted sequentially by the tag 20. FIG. 5 illustrates a mode of application of this embodiment. The position of the beacon 30 is known in space and makes it possible to determine a path of the tag 20 by the analysis of a succession of receptions of messages $M_1$ transmitted from different positions.

Figure 3:
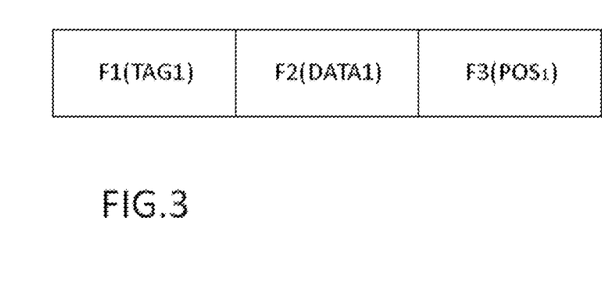
FIG. 3: an example of data frame comprising an association between a location of an equipment and a datum transmitted by this equipment.

According to a second embodiment, the plurality of receptions of message $M_1$ is carried out by a set of beacons $30_A$, $30_B$, $30_C$ spread out over a given geographic zone. This embodiment is illustrated in FIG. 3 by the three blocks comprising a reception module comprising an antenna for receiving messages in the UWB band. The positions of each beacon 30 are known and make it possible to define, for example, a basic frame of reference in order to locate a tag 20.

According to an embodiment, the system of the invention comprises two beacons of which the respective positions in space are known. The method of the invention enables an estimation of the difference in the arrival times of the messages received by each beacon. It is thus possible in this case to obtain a position information on at least one dimension of space. This possibility offers solutions for locating a datum transmitted for example in geometrically constrained zones such as corridors, lifts, tunnels or another zone.

In the case of use of three beacons, an interest is to obtain a position information according to two dimensions of space. And by adding a fourth beacon to the system, the method of the invention makes it possible to obtain an additional dimension such as the height or to further improve the precision of the positioning of the tag.

The method thus comprises a step of reception REC of the UWB messages by the beacons 30. The method comprises a step of demodulation of the messages $M_1$ and a step aiming to time stamp HORO the arrival of the messages. According to an exemplary embodiment, the quality of the receptions is estimated in order to reduce false detections or to apply a particular filtering in order to reduce errors during the demodulation of the signals. Each beacon 30 carries out these three steps of reception, demodulation and time stamping of the messages received $M_1$. Moreover, each beacon 30 transmits, at the step TRANS $M_{2i,\ i\in[A,B,C]}$, a message $M_{2A}$, $M_{2B}$, $M_{2C}$ to a calculator SERV$_1$ centralizing the data transmitted notably to determine the position of the tag. According to an example, the calculator SERV$_1$ is a server. According to an embodiment, the messages $M_{2A}$, $M_{2B}$, $M_{2C}$ transmitted by each beacon 30 thus comprise data DATA$_1$ of the equipment EQ$_1$, data TAG$_1$ of the tag 20 and enriched data HORO$_1$ of the beacons 30 notably comprising the arrival times of each message $M_1$ received.

According to an embodiment, the method of the invention next comprises a step of reception REC of the messages $M_{2i,\ i\in[A,B,C]}$ transmitted by each beacon 30. According to a particular embodiment, the calculator SERV$_1$ may be arranged in one of the beacons 30.

The method comprises a step of processing $\Delta_{tvol}$ the different dates of reception of the messages $M_1$ received by the different beacons 30.

According to an exemplary embodiment, when a same UWB message $M_1$ is received by several reception beacons 30, the position of the UWB tag 20 may be estimated by comparing the respective arrival times of the UWB message on each of the receptor beacons 30. Notably, the position of the tag 20 may be estimated, in a known manner, by calculating for several pairs of beacons 30 the time difference of arrival (TDOA) of the UWB message on the receptor beacons 30 of each pair. This calculation step may be carried out from a time stamping of each message received $M_1$ by each reception beacon 30.

In this step, according to an exemplary embodiment, the quality of the signal received may be taken into account to estimate if a datum is taken or not into account in a calculation.

According to an embodiment, the times-of-flight of the messages $M_1$ make it possible to determine the location of the tag 20, for example, by means of a trilateration algorithm estimating the differences in arrival times of the messages. Such an algorithm may be known to the person skilled in the art.

According to other embodiments, the estimation of the position of a tag 20 is carried out from a method for estimating position being able to use notably, alternatively or as a complement, the arrival powers and/or the arrival frequencies of the UWB messages at the level of said reception beacons 30. However, an interest of the use of UWB messages is that they make it possible to have very precise arrival time measurements, which also makes it possible to estimate the location of the tag in a very precise manner.

To this end, the method comprises a step of determination of the location POS$_1$ or more generally of a location information POS$_1$. This location information may comprise:
- a reconstructed position comprising coordinates of GPS type;
- a relative location in a reference system of space defined vis-à-vis the positions of each beacon;
- a vector of which each component corresponds to a measurement of the times-of-flight between the tag and a given beacon or a measurement of arrival dates at each beacon,
- etc.

According to an embodiment, the method of the invention comprises a step of association of the location information POS$_1$ and the data DATA$_1$ and optionally the data of the tag TAG$_1$.

In order to make an association of data making it possible to render unfalsifiable the integrity of the data DATA$_1$, the latter may be associated in various ways such that a third party cannot reproduce this association.

The association of position data and the data DATA$_1$ may comprise a step of encoding, interleaving and/or encryption of the data with one other.

In another embodiment, the position information POS$_1$ may define a unique key aiming to restitute a value qualifying if the position is verified or not. Thus, the position information is not necessarily transmitted from the moment that an association key makes it possible to certify that the position is validated.

According to an embodiment, the position information $POS_1$ makes it possible to define an encryption key or a password to transmit to a third party application. According to another embodiment, the different components of a position vector may be combined in order to encode the data $DATA_1$.

FIG. 2 represents an embodiment of an equipment $EQ_1$ associated with a UWB tag 20. This association may take different forms according to the cases of application of the invention. The device comprising the equipment $EQ_1$ and the tag 20 is called a transmitter device 1. According to an embodiment, the equipment $EQ_1$ integrates the tag 20 in the sense where an electronic and physical interface makes it possible to exchange data between the two entities. A same frame may be used for the two entities $EQ_1$ and 20.

According to another example, the two entities $EQ_1$, 20 may be physically disjointed. In this scenario, the UWB tag 20 communicates with the equipment $EQ_1$ by means of a wireless interface.

According to an embodiment, the equipment $EQ_1$ comprises a memory M, a calculator K and a sensor C making it possible to collect a datum $DATA_1$. In the example of FIG. 2, the equipment $EQ_1$ comprises a physical interface 10 compatible with an interface 26 of a UWB tag. The UWB tag 20 comprises a modulator 25 and an antenna 21 for transmitting a signal in the UWB band. The data $DATA_1$ are acquired from the interface 26 and modulated by the modulator 25. According to an embodiment, a memory and a calculator may be integrated in the tag 20 for processing, storing, shaping the data coming from the interface 26.

According to an exemplary embodiment, the UWB tag comprises a supply in order to supply a voltage to the different components. According to another embodiment, the supply comes from the equipment $EQ_1$. It may be conveyed by a connector from the interface 26.

According to an embodiment, the tag 20 comprises a control module (not represented) configured to control the transmissions of UWB messages $M_1$. According to an embodiment, the transmission period, the transmission power, the encoding of data, UWB modulation, etc. are configured in the control module to carry out the transmissions of UWB messages $M_1$. According to an embodiment, the different functions listed may be supported by different components or be implemented by the same component.

According to an exemplary embodiment, the tag 20 comprises a radio reception module 23 for receiving a stream of radio waves. In this embodiment, a transmitter beacon (not represented) of a radio stream enables the tag 20 to collect a radio frequency energy.

According to an embodiment, a transmitter beacon of a radio stream may be one or more wireless electrical supply units (not represented) spread out over the geographic zone covered by the beacons 30. In this embodiment, the wireless electrical supply units remotely supply the tags 20 with electrical energy.

The transmitter beacons, also designated "wireless electrical supply units", are distinct from the receiver beacons 30. Nothing excludes however, according to other examples, having one or more of said wireless electrical supply units which are integrated in one or more receiver beacons 30, such that at least one equipment of said system for estimating position is both a wireless electrical supply unit and a receiver beacon 30.

According to the embodiment of FIG. 2, the tag 20 comprises a rectifier 24 to convert the spectral power received by the radio reception module 23 into an electric voltage or current. The converted energy may then be stored in an electrical accumulator (not represented). The electrical accumulator thus behaves like a battery making it possible to deliver the energy necessary for the transmission of UWB messages.

According to an embodiment, the transmitter device of the invention could also supply the sensor and/or the calculator, for example a microprocessor, which interface with the UWB modulator.

In this latter case, a supply link makes it possible to supply at least one sensor of the transmitter device 1 of the invention, notably the equipment $EQ_1$. The supply link is thus in this case established between the tag 20 and the sensor or more generally the equipment $EQ_1$. To describe this electrical supply link and the different embodiments, the terms "sensor" or "equipment $EQ_1$" are used indiscriminately in so far as the equipment $EQ_1$ may be reduced to a sensor provided with an interface to connect with the UWB tag.

According to an embodiment, a programmable configuration memory may be embedded in the UWB tag in order to store parameters of level of energy to transmit to the sensor. This function is particularly advantageous when the equipment $EQ_1$ or the sensor comprises a wake-up function that can be activated by a reception of a minimum amount of energy. According to a case, a configuration makes it possible to automatically activate a supply of the tag 20 to the equipment $EQ_1$ from an electrical link. This activation may be triggered, for example, when a minimum voltage threshold and/or a minimum accumulated charge are available within the UWB tag. The energy collected by radio channel may thus be used on the one hand to supply the UWB modem to trigger the transmissions of messages $M_1$ and on the other hand to supply at least one sensor of the equipment $EQ_1$.

According to an exemplary embodiment, the sensor of the equipment $EQ_1$ is connected to the tag 20 by a digital link, notably to ensure the transfer of useful data $DATA_1$. Alternatively, the link is analogue. It may be ensured by one or more analogue-digital converters and/or digital-analogue converters, respectively noted ADC and DAC. In the case of the implementation of an ADC type converter, it is for example the UWB tag 20 which carries out the analogue measurements, which digitally converts the signal and which transfers the result in the form of a payload $DATA_1$ within the transmitted UWB message.

According to an example, the UWB tag 20 comprises a memory for collecting, storing and possibly averaging several measurements received from at least one sensor of the equipment $EQ_1$. According to a configuration, at the end of a data collection period, the data stored in the memory are transferred in the form of a payload $DATA_1$ into the message $M_1$ transmitted in UWB.

According to an embodiment, an identifier of a sensor of the equipment $EQ_1$ is transmitted in the heading of the UWB frame.

According to an embodiment, the physical datum measured by a sensor is used as identifier of the sensor within the message $M_1$ transmitted by the tag. This configuration ensures that each received message $M_1$ indeed comes from the same UWB tag 20 and thus from the same sensor that is associated therewith.

According to an example, an equipment $EQ_1$ comprising different measurement sources forming a same sensor or several sensors makes it possible to collect different measurements of physical parameters. These different measurements are in this case associated with a UWB tag 20. Thus, the equipment $EQ_1$ comprising at least one sensor measuring a temperature parameter and a pressure parameter each transmit the measured data to the UWB tag 20. The UWB tag 20 is, for example, configured to transmit, in this case, two distinct transmissions. The first transmission comprises a datum relative to the temperature measurement which is used as identifier of the first transmission and the second transmission comprises a datum relative to the pressure measurement which is used as identifier of the second transmission.

An advantage is to obtain a configuration in which the UWB tag 20 may be associated with a plurality of sensors at the same geographic position and each having their own identifier. The identifiers, whatever they are, are preferentially transmitted in the data link between the sensor and the UWB tag 20 to be next transmitted to the beacons. According to a scenario, the identifiers of the sensor(s) are stored in the configuration memory of the UWB tag 20.

According to different embodiments, the sensor may be a temperature sensor, a pressure sensor, an analogue and/or digital current sensor of ADC type, an expiry date sensor, a date sensor. According to other examples, the sensor may comprise a fixed memory content, a smart circuit with an integrated microprocessor, or an actuator.

In the case where the sensor comprises a smart circuit with an integrated microprocessor, or an actuator, the latter may be a DAC converter. In this case, the supply serves, for example, to activate an external smart circuit which in an autonomous manner triggers ADC outputs which are next measured by the UWB tag to generate useful data $DATA_1$. In this case, the UWB message $M_1$ generated by the tag 20 serves to return to the beacons a UWB status to indicate if the ADC has been triggered. A particularity is that the UWB tag does not make it possible to functionally control the sensor, but uniquely to supply it from a collection of energy by radio channel. The UWB tag is thus not used to ensure a descending functional link from the beacon. In this case, the sensor of the equipment $EQ_1$ associated with the UWB tag 20 remains autonomous in its decision, it serves for example as actuator.

According to an embodiment, the supply link between the UWB tag 20 and the equipment $EQ_1$ may be conditioned by a notification of the sensor of said equipment $EQ_1$. In this latter case, the management of the supply comprises two supply modules. A first supply module supplies the sensor for its wake-up, a second supply module, for example of stronger power, triggers the sensor. "Stronger power" is taken to mean a power greater than that required to "wake-up" the sensor. In the different embodiments, the power is however limited from several nanowatts up to possibly several milliwatts. The triggering of the sensor makes it possible to activate a transmission of a measurement carried out by the sensor to the UWB tag 20.

In this example, the supply link of the first module and/or the second module is preferentially one-way from the UWB tag 20 to the equipment $EQ_1$. The data link enabling the exchange of data may be according to a two-way example. In this case, the UWB tag 20 then indicates a level of energy available at a given time. According to a configuration and according to the electrical need estimated by the sensor of the equipment $EQ_1$, the sensor may then decide or not to request the start-up of the "power" supply of a function to execute. If the level is not sufficient, the sensor may transmit a request aiming to ask the tag 20 to activate a wake-up after a given duration, for example of several milliseconds, or after a collected reserve of energy above a given threshold. This regulates the principle of supply known as "blind" which makes it possible to wake up a sensor only when said sensor has sufficient energy so that it finishes its measurement, saves the data and transmits it to the tag 20.

According to this exemplary case, each measurement of a sensor is associated with a minimum energy level to engage a sequence of actions to carry out by the sensor. An interest is to optimize the management of the collected energy of the device 1 of the invention comprising the UWB tag 20 and the equipment $EQ_1$.

According to an embodiment, the sensor of the equipment $EQ_1$ comprises calculation means for programming the configuration memory of the UWB tag 20 in such a way that it saves in a memory a minimum configuration corresponding to the state of the data of the sensor of the equipment $EQ_1$ before its next supply. This option makes it possible to cover the case in which the equipment $EQ_1$ is no longer supplied from a duration exceeding a given threshold. In this case, the invention makes it possible to offset a too long non-supply in which the accumulation of energy would be stopped sufficiently long to no longer supply the tag 20 itself. Thanks to the memory, when the energy begins once again to be accumulated thanks to the accumulator, the saved minimum configuration is read again and thus the tag 20 activates the minimum requests of the sensor. This memory may be a flash memory, a MRAM or any other non-volatile memory.

According to an embodiment, the link for triggering the supply of power may be a simple I/O interface that triggers a sensor of the equipment $EQ_1$ when it has received sufficient energy. It is the sensor or a component of the equipment $EQ_1$ that in this case uses an ADC to measure the voltage available on the tag 20 and to decide the moment when it will receive the supply. It is in this case the sensor or the equipment $EQ_1$ that decides "on demand". This embodiment is an alternative to the embodiment in which the tag 20 is programmed and decides when it supplies the sensor.

In an embodiment, the tag 20 comprises a configuration aiming to engage a self-learning mode of the management of the energy from an accumulator integrated in the tag 20.

According to an example, the first time, the tag 20 realizes a maximum charge and triggers the supply of the sensor. After the complete phase comprising the sequence ranging from the triggering of the supply of the sensor up to the transmission of the message $M_1$, the tag 20 measures the remaining amount of energy available in its accumulator. It thus automatically adjusts its next triggering threshold as a function of one or more first measurements. In this example, the invention makes it possible to avoid accumulating 100% of the charge of the accumulator if only a part of this energy, such as 50%, is necessary to engage a complete sequence. The tag can carry out a learning of this consumption over several cycles to ensure that the consumption is reproducible and that it does not vary too much from one sequence to another. The minimum limit is thus determined by several successive measurements and stored in a non-volatile memory.

According to an embodiment, a step of a data exchange protocol or an I/O interface ensures the engagement of a step corresponding to an "end of operation". The end of operation information is, for example, possibly transmitted from the sensor of the equipment $EQ_1$ to the tag 20. This end of operation information makes it possible to engage, for example, the transmission of the message $M_1$ in UWB.

According to an embodiment, the accumulator is integrated in the equipment $EQ_1$ or directly in the component of the sensor. In this case, the accumulator is perceived as an external accumulator from the point of view of the UWB tag 20. The UWB tag then charges the external accumulator, and carries out a control of the level of accumulated energy. Thus, the accumulation capacity is determined by the sensor itself as a function of its needs. The tag 20 thus comprises a module for carrying out a function ensuring the charge of the sensor or the equipment $EQ_1$.

According to an embodiment, the transmitter device 1 of the invention comprises on the one hand a UWB tag 20 comprising a first accumulator and on the other hand an equipment $EQ_1$ comprising at least one sensor and a second accumulator of energy. In this embodiment, the device 1 of the invention comprises two energy reserves which may be available to operate the tag 20 independently of the sensor.

According to a case of application of the invention, software for surveilling the availability of programs, noted SW-SDP, is installed on a device 1 of the invention, notably within the tag 20. Such software is better known by the name "Heartbeat". In this application, the software SW-SDP may be implemented so as to produce protocol data or signals within an I/O interface by a calculator to ensure that the sensor is not blocked for example due to a lack of supply or a breakdown. If the tag 20 no longer sees the software SW-SDP, it deduces therefrom that the level of energy is not sufficient so that the sensor goes up to the end of its cycle. "No longer sees" is taken to mean that the tag 20 no longer receives data or signals from the equipment $EQ_1$. In this case, the tag 20 re-evaluates a next upwards charge of the accumulator to trigger a new wake-up of the sensor and/or a new re-interrogation of the useful data $DATA_1$ being able to be communicated to it by the equipment $EQ_1$. According to an exemplary case, the UWB tag 20 may renew a self-learning cycle described previously. The program SW-SDP may be configured to execute initialization scripts when it no longer receives signals or data from the equipment $EQ_1$.

According to another application of the invention, a time delay function may be implemented by the device 1 of the invention, notably between the tag 20 and the equipment $EQ_1$. According to an example, a continuous operation of the equipment $EQ_1$ and the tag 20 may be ensured by the fact of a collection of sufficient energy by radio channel. In this case, this energy may be non-optimized to ensure all the sequence of exchanges of energy and data at regular periods between the tag 20 and the equipment $EQ_1$. The invention makes it possible to implement a time delay function to adjust the activation cycle period of a complete sequence by the introduction of a time delay. Thus, the time delay makes it possible to optimize the wake-up of the equipment $EQ_1$ by the tag 20 and the sequencing of exchanges of data or energy subsequent to this wake-up. An interest of such a time delay function is to decrease the load on the link between the tag 20 and the equipment $EQ_1$ and to free time on the UWB channel during transmissions of the tag. An interest is also to decrease possible collisions with other transmissions coming from other UWB tags when the transmissions of the messages $M_1$ are generated automatically after a charge of the accumulator.

According to another application, a control function aiming to collect state data may be implemented by the device 1 of the invention. Among these state data integrated in a message $M_1$ transmitted by the tag 20, it is possible to find according to the cases of implementation of the invention charge information, such as the charge duration, the charge amount, the consumption of the sensor of the equipment $EQ_1$ or the total consumption of the equipment $EQ_1$. In the latter case, the data may be encoded in the transmitted UWB signal. An advantage is to monitor the operation of a pool of sensors and thus detect zones where the supply may be considered insufficient or too abundant.

When the tag 20 is configured with a self-learning function, it may, according to a case, comprise an anomaly detection function. This function allows the tag 20, for example when the sensor is incapable of going to the end of its protocol ending up in the generation of an end of function indicator, to generate a message indicating an error status. This function makes it possible to offset the non-reception by the tag of this end of operation indicator. The tag 20 then transmits an anomaly signal, indicating that it is incapable of operating the sensor of the equipment $EQ_1$ with which it is associated. In the case where the tag 20 would even be at its maximum capacity, it may be configured to try again each time to transmit a message $M_1$ to ensure that it is not just a temporary breakdown.

According to an embodiment, the tag 20 comprises an energy capacities management module (not represented) to trigger the transmission of a message in the UWB band from the UWB modulator. This management module may be controlled so as to transmit a message as soon as a level of collected electrical energy is sufficient to transmit a UWB message of a given size. According to an embodiment, different thresholds are configured to transmit different messages $M_1$ according to a given configuration. According to an embodiment, a management of a random variable makes it possible to generate messages in random manners from the UWB tag 20. According to another embodiment, the tag comprises a clock making it possible to transmit the messages $M_1$ at regular time intervals during a lapse of time.

FIG. 3 represents an example of frame transmitted by the server $SERV_1$ associating data originating from the equipment $EQ_1$ in a field $F_2$, data originating from the UWB tag 20 in a field $F_1$ and data relative to the position information $POST$ of the tag 20 in a field $F_3$. This example of frame is a juxtaposition of fields not enciphered in a message $M_{S1}$ transmitted to a remote server $SERV_2$. According to other embodiments, other frames may be constructed from these data. According to an exemplary embodiment, a unique key is transmitted, the unique key being generated from an association between the data $DATA_1$ and the position information $POS_1$. Thus, the simple control of the value of the unique key may be carried out in order to certify the origin of the message $M_{S1}$.

Figure 4:
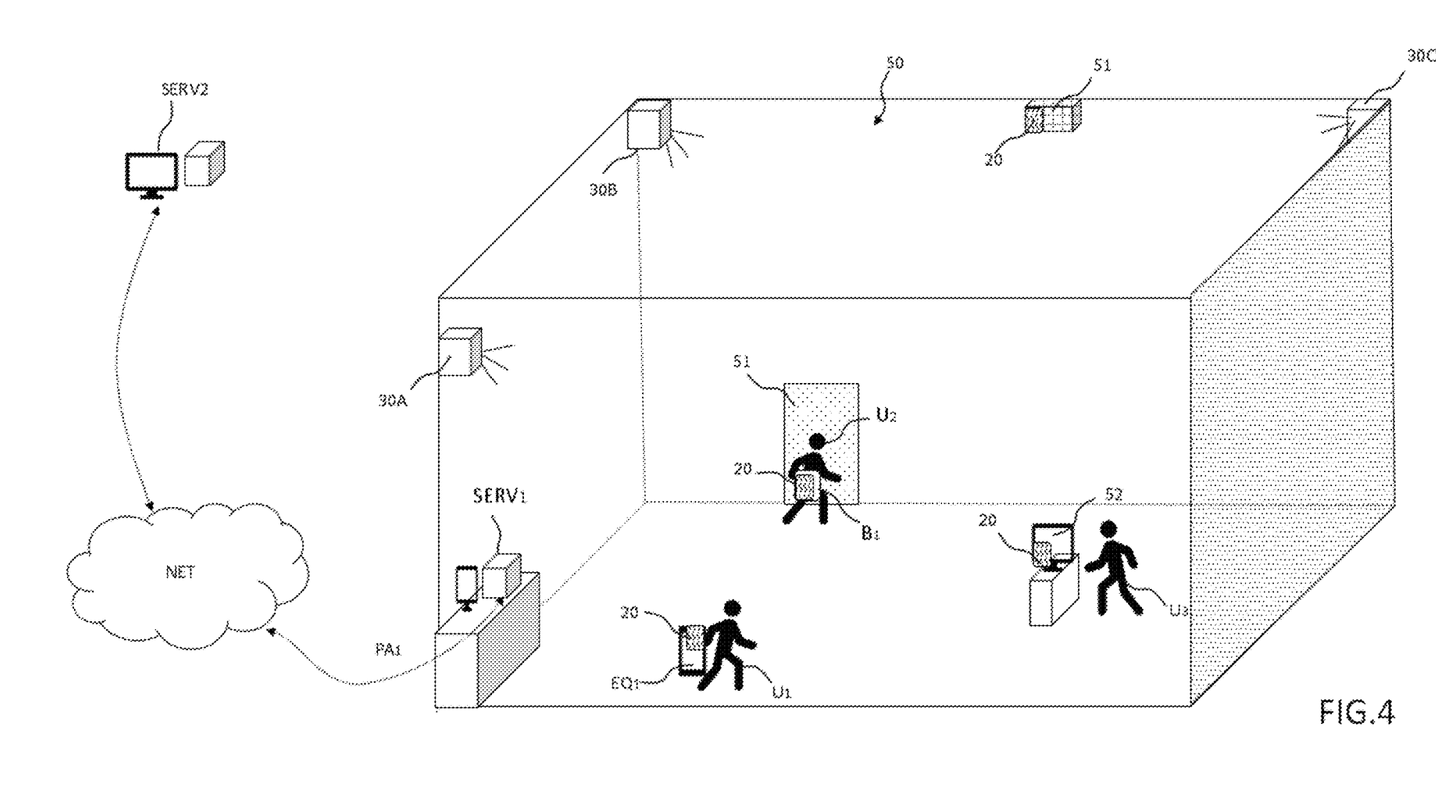
FIG. 4: a perspective view of a place in which are arranged receiver units for receiving messages coming from transmitter devices according to different embodiments of the invention.

In FIGS. 4 and 5, a place 50 is represented by a closed space. It may be a hangar, a room, a factory, a hall, a gallery or any other place a priori partially or totally enclosed by walls and/or a roof. Such a place generally has means to make it possible to attach equipment to the walls or to the ceiling. The invention will be described through exemplary embodiments in such a place. However, the invention also applies to open or public spaces from the moment that supports making it possible to fasten at least one receiver beacon 30 are present.

The example of FIG. 1 is detailed through several exemplary embodiments corresponding to different cases of application of the invention. In this example, a plurality of receiver beacons $30_A$, $30_B$, $30_C$, and more generally noted 30, are arranged so as to receive UWB signals coming from a transmitter 20. According to an embodiment, the beacons 30 form part of a system comprising means configured to calculate by a trilateration method a position information of the UWB transmitter 20 or 1.

The example of FIG. 5 is detailed and illustrated through an exemplary embodiment corresponding to a case of application of the invention. In this example, a single receiver beacon 30 is arranged so as to receive UWB signals coming from a transmitter 20 which evolves in the space. According to an embodiment, the beacon 30 is configured to calculate by a trilateration method the position of the transmitter 20 of UWB signals in a given time period.

In the two exemplary cases of FIGS. 4 and 5, the server $SERV_2$ may comprise a database comprising reference data being able to be used to corroborate the position information received from the server $SERV_1$. Thus, according to an embodiment, the server $SERV_2$ makes it possible to validate the integrity of the useful data $DATA_1$ as a function of the identifier $TAG_1$ of the transmitter and as a function of the position at which the data $DATA_1$ have been generated.

According to an exemplary embodiment, the server $SERV_2$ transmits a message $M_3$ enabling the user to access a service. The message $M_3$ may be transmitted to a computer, to a server, to an equipment connected to internet or even to the transmitter device 1. According to the case of application, the rights making it possible to access a service may be delivered remotely from the server $SERV_2$ or from another server receiving a request from the second server $SERV_2$. This may be the case when an operation requires an authorization emanating from a rights management server such as a bank server or any other server necessitating information relative to the user not shared by the server $SERV_2$.

Presence in Premises

FIG. 1 represents a first user $U_1$ comprising a smartphone $EQ_1$. The first user $U_1$ enters, for example, into his workplace, such as a shop. When he enters the premises, it is necessary that this person can access different services. It may be necessary that he has at his disposal particular computer rights in order to activate different items of equipment or applicative services. It may be a payment terminal, access to a directory of a server, or instead access to a service for managing the work time of a set of salespersons.

The user $U_1$ bears a UWB tag 20 which may be associated with the smartphone $EQ_1$ while being for example attached to the telephone. In this case, the tag 20 may, for example, be integrated in a cover or in a holder or instead in the form of a sticker. In this case, the transmitter device 1 of the invention corresponds to the smartphone, to its holder and to the tag 20.

According to another example, the UWB tag 20 is arranged in another equipment. In this latter case, it is then the whole of the equipment: UWB tags 20 and smartphone $EQ_1$ that correspond to the transmitter device 1 without them being necessarily attached to each other.

When the user $U_1$ is in the shop 50, the UWB tag 20 transmits a signal that is received by each beacon 30. According to an embodiment, a trilateration algorithm executed by a calculator $SERV_1$ makes it possible to determine the position $POS_{U1}$ of the UWB tag 20 from each signal received from the tag within each beacon 30. Thus, according to an embodiment, the data transmitted by the tag 20 also comprise at least one datum $DATA_1$ coming from the smartphone $EQ_1$. The data transmitted from the smartphone $EQ_1$ to the UWB tag 20 may comprise, for example, an identifier or instead data coming from a given service, such as a request to access a remote service.

The link between the smartphone $EQ_1$ and the UWB tag 20 may be a wireless link such as a Bluetooth link. In this exemplary case, the UWB tag comprises a compatible reception interface, here a Bluetooth interface. Any other type of interface may be used according to the interface used by the equipment $EQ_1$. According to another embodiment, the tag 20 may be associated with a support or a physical and/or electronic interface making it possible to establish a wired link with the smartphone for example from an USB, USBC or audio jack interface.

The UWB tag 20 is then able to transmit at least one UWB message which will be received by the beacons $30_A$, $30_B$, $30c$. The data $DATA_1$ are next demodulated by each beacon 30.

A server $SERV_1$ may be used to carry out the calculation of the position POST while recovering the arrival dates of each demodulated message $M_1$ coming from each beacon 30. The data $DATA_1$ are next associated with a position information resulting from an operation aiming to compare the different times-of-flights of each signal received by each beacon 30.

The information originating from the smartphone $EQ_1$ may then be associated with a position information of the user $U_1$. This association makes it possible to control that the user $U_1$ is indeed in the premises 50 of the company/the shop, and it makes it possible, moreover, to know his position precisely. Thus, it appears that his position $POS_{U1}$ may be used as a password to access a certain number of services. An interest is to render this information unfalsifiable by a third party who is not precisely located in the premises. An interest is to secure the access control of a user to services without however that a password is necessarily used by the user $U_1$. The identity of the user $U_1$ is thus falsifiable with difficulty.

One application consists in transmitting as datum $DATA_1$ a public key. When the position POST is verified by a remote equipment, such as a server $SERV_2$ for managing user accesses and rights, then the latter may transmit an enciphered password with the public key transmitted by the UWB tag to an access control equipment. The access control equipment may be a payment terminal, a computer comprising a service, or any other equipment validating the access. It may also be the equipment $EQ_1$ in so far as the latter can provide access to a remote service. The access control equipment decrypts the enciphered message with a private key.

An advantage is that to enable the transmission of an enciphered public key it is necessary to be physically at a position or in a permitted zone.

A concrete application of this embodiment is access to a WiFi network when one is in a certain zone covered by this WiFi network and by a UWB coverage from beacons 30.

It may be for example a hotel in which it is possible to access the WiFi network without having to enter a password and uniquely when one is situated in a bedroom or lounge of said hotel. Thus, a third party cannot access the network without being physically in the premises.

The WiFi network may also be used for the purposes of increasing the control of the integrity of the data transmitted. In this case, the data describing the association between the data $DATA_1$ and the location of the user $U_1$ may be corroborated with another location information, for example, acquired from the WiFi connectivity or from an image originating from a camera. This option makes it possible to secure the control of the integrity of the position information.

Thus, when the user $U_1$ is identified by means of a transmitted datum that has been located, he may then access services.

According to an exemplary case, a control of the coherency between the different position information data is carried out. This control may be carried out without however a position being calculated.

A first example for controlling the coherency of the different position information data is to verify that the different arrival times of a message $M_1$ transmitted by a UWB tag 20 within a plurality of beacons 30 are comprised in a predefined maximum time interval. Such a verification makes it possible to ensure that the messages $M_1$ indeed come from a transmitter of which the location is coherent. If this is not the case, it may be an attempt to usurp a datum by a third party. The system is based on the fact that it is extremely difficult to corrupt such an integrity control in very short time scales of the order of the nanosecond to several hundreds of nanoseconds, or even the microsecond.

In this latter case, the method of the invention makes it possible to ensure that the different messages received $M_1$ indeed come from a same transmission.

As a complement, a common information of each message received $M_1$ may be decoded, such as an identifier. It involves verifying that the messages received by each beacon come from a same transmission. This control may be carried out within a beacon which collects the other received messages $M_1$ or within a remote server which collects the data extracted from the messages $M_1$ received by each beacon as well as the time stamping data.

According to another embodiment, the method comprises a step aiming to recognize a sequence of identical data between the different received messages $M_1$. There is thus not necessarily a predefined identifier. The compared sequence originating from each received message $M_1$ may form an ad hoc identifier.

According to a first case, the sequence is extracted at a given position of a data field from the received message $M_1$, such as a field of the data $DATA_1$ or instead a field of the data produced by the UWB transmitter such as its identifier $TAG_1$.

According to a second case, the sequence of data that is compared is chosen randomly within the received message $M_1$. In this latter case, the extracted sequences, even though chosen randomly, are chosen in the same way between all the messages $M_1$ received by each beacon 30. A random variable makes it possible to determine the sequence to compare of each message $M_1$. It is then shared between the different beacons 30 which can extract the sequence forming the identifier or by the server making the comparison from the different messages $M_1$.

An interest of the use of an ad hoc identifier is to carry out a control of the data without having to decode the information contained in the message $M_1$. This control may be done from enciphered or encoded data. This option offers a possibility of dissociating the different layers processing the received messages $M_1$. For example, a first processing layer aims to verify the coherency of the received messages $M_1$ coming a priori from a same transmitter, a second processing layer comprises the verification of the integrity of the data by comparison of the position information data and a third processing layer aims to exploit the useful datum $DATA_1$. The different processing layers may be implemented by different or identical servers according to the case of exploitation.

Access Control to a Door

FIG. 4 represents a user $U_2$ having an electronic chip comprising a memory with an identifier. This electronic chip corresponds to the equipment $EQ_1$. This electronic chip may be integrated for example in a company badge $B_1$ comprising a support. The identifier may be used to access different services within his company, such as payment in the canteen, opening up secure premises, reserving a room, etc.

According to an embodiment, the memory of the electronic chip comprises other data such as identifiers, passwords or keys making it possible to access services.

In the case of FIG. 4, the badge $B_1$ comprises a memory storing at least one identifier. The badge $B_1$ comprises an interface making it possible to communicate with a radio tag 20 comprising a UWB modulator able to transmit signals and more particularly pulse sequences in the UWB band.

According to an exemplary embodiment, the badge $B_1$ may be integral with the tag such that they are bonded together. A physical interface may then be produced between the electronic chip and the radio tag.

According to a simple case, the equipment $EQ_1$ is a radio tag comprising a memory with an identifier.

According to another example, the badge $B_1$ may be disengaged from the UWB tag. In this case a wireless interface enables the transfer of data from the badge $B_1$ to the UWB tag 20. A radio interface may be realized such that the identifier is transmitted spontaneously at regular intervals or after a wake-up or an activation of the badge $B_1$.

According to another example, the user $U_2$ may wear a bracelet comprising a UWB tag and a badge $B_1$, the entities being disengaged.

In this example, the transmitter device 1 of the invention is, for example, a plastic badge and a UWB radio tag 20 integrated in another equipment.

The user $U_2$ approaches the door 51 in order to access a room of which an access control authorizes or not a person to penetrate therein.

According to a first exemplary case, the coded identifier is modulated by the UWB modulator and the antenna of the UWB tag to be transmitted to the different beacons $30_A$, $30_B$, $30c$.

Each beacon $30_A$, $30_B$, $30c$ receives a signal describing a radio message $M_1$ coming from the tag 20. The message $M_1$ comprises at least one datum $DATA_1$ such as an identifier of the user $U_2$. According to different embodiments, other data may be modulated and transmitted in the message $M_1$. Each beacon $30_A$, $30_B$, $30c$ then transmits the data coming from the demodulated signal, as well as at least one time stamping information to a server $SERV_1$.

According to an embodiment, the server $SERV_1$ determines by a predefined algorithm the position of the tag 20 of the user $U_2$ by combining the different time stamping information coming from each demodulation of each beacon $30_A$, $30_B$, $30c$.

The server $SERV_1$ makes an association between, on the one hand, the position $POS_{U2}$ or data describing this position $POS_{U2}$ and, on the other hand, the demodulated useful data $DATA_1$.

According to different scenarios, this association may take different forms:
- a generation of a unique key from two items of information; this unique key may be the key of a database associating the two items of information {$POST_1$, $DATA_1$} and/or;
- a generation of an encrypted key from two items of information; this may be carried out for example by an algorithm combining different operations such as encoding, truncation, interleaving, data permutations, etc. An algorithm based on a private key may also be used in order to encipher a datum associating the two items of information.

The server SERV$_1$ then transmits a message M$_{S1}$ to a remote server SERV$_2$ by means of an access PA$_1$ in order to request access rights to the room closed by the door 51. The server SERV$_2$ then receives the message M$_{S1}$ transmitted by the first server SERV$_1$. The data link between the servers may be realized through a network such as the network NET of FIG. 4, which may be the internet network or an intranet network. According to another example, this link is a point-to-point link.

The server SERV$_2$ then controls the identifier of the transmitter device 1. According to an embodiment, this identifier is associated with a position POS$_1$ or an information relative to the position POS$_{U2}$ of the user U$_2$. By considering that the user U$_2$ has access rights, the server SERV$_2$ may thus certify that the identity of the person U$_2$ has not been usurped, and that the user U$_2$ situated in front of the door 51 is indeed the bearer of the UWB tag 20 having access. This position information POS$_1$ makes it possible to control the integrity of the identifier transmitted with the access request.

In this case, an access authorization may be transmitted to a locking case of the door 51 which is controlled, for example, by a digital control transmitted from a data network.

Location of a User Account Accessing a Network from a Machine

FIG. 4 represents another user U$_3$ accessing a service offered by a computer 52, said computer 52 being connected to a private network. The tag 20 is associated with this computer 52. The user U$_3$ connects to a service by means of an identifier and a password.

In this case of application, it is wished to know from which computer the user U$_3$ has opened a session and has carried out a given action. It is then possible to locate in a certain manner the identifier of the user transmitted during his connection.

In the same way, a transaction datum may be located for the purposes of being authorized or not.

In this embodiment, the UWB tag 20 may be interfaced with the computer 52 by a physical connection such as an SD card, a USB plug, or instead by a wireless connection such as a WiFi, RFID, Bluetooth link, etc.

Control of an Autonomous Sensor

FIG. 4 illustrates a fourth example of a case of use of the present invention.

According to an embodiment, an equipment connected to a network, such as internet, comprises a sensor. In the exemplary case of FIG. 4, it is a smoke detector 51. This detector 51 is associated with a tag 20 according to a physical or wireless interface. The transmitter equipment EQ$_1$ here thus corresponds to the smoke detector 51 and to the UWB tag 20.

In this scenario, the configuration of the transmitter equipment EQ$_1$ comprises the configuration of the data to transmit to the tag 20 and the period at which these transmissions are reiterated.

Certain data DATA$_1$ transmitted or stored in the smoke detector 51 may be transmitted to the UWB tag 20 according to this configuration. According to an example, the identifier of the detector 51 may be transmitted to the tag 20. Alternatively, this latter identifier may be stored in a memory of the UWB tag 20 and be directly transmitted to the beacons 30.

According to an exemplary embodiment, the data DATA1 comprise raw data collected by a sensor. According to another example, the data DATA1 correspond to filtered data, for example of which the value of a physical parameter has exceeded a given threshold. According to an exemplary embodiment, the datum DATA1 corresponds uniquely to a status among a list of predefined statuses: {in operation, out of service, alarm detected, reduced supply, etc.}.

Thus, in the event where a smoke detector detects smoke, it triggers an alert. The alert is transmitted notably through the UWB tag 20 to the beacons. The beacons with the operation described previously demodulate the signals and a calculator SERV1 compares the times-of-flight. Thus, the position of the smoke detector is reconstructed from a calculator centralizing the different UWB messages 20 received by each beacon. Such an equipment may be a data server SERV$_1$. An interest is to locate the datum transmitted by the smoke detector 51 in a certain manner. Thus, the location of the detection of smoke may be corroborated with the alert that has been transmitted and received via another system for managing alerts in a building.

A remote server SERV2 may for example carry out the functions of collection of data coming from the different systems and of analyses aiming to validate a decision.

FIG. 5 represents an alternative operation in which it is not a precise position of a tag that is determined, but a trajectory identified by a trilateration algorithm. The method consists in analyzing the successive times-of-flight from a same transmitter. An interest of this solution is to minimize the number of beacons used and to relax the constraint on the precision of position. A case of application is the detection of the presence of an individual in a given zone. It may be for example an operator in a hangar handling different tools and following a route.

Trilateration makes it possible to ensure a position of a user having made a displacement and of which it is wished to verify the presence in a zone for example.

In this exemplary case, the UWB tag may be associated with a smartphone, a tablet, a wireless electronic terminal aiming to carry out an inventory of a stock, etc.

The UWB tag transmits a signal at three successive positions POS$_a$, POS$_b$ and POS$_c$, it is assumed that the user U$_1$ moves about in the zone covered by the beacons 30. In this example, the data DATA$_1$ comprise for example a stock inventory of parts in an alley of a hangar. The different parts of a stock are assumed to be at a given position. Thus, it is possible to corroborate a path of a user equipped with a tag with the expected stock inventory.

According to an embodiment, the system of the invention makes it possible to detect and to exploit a set of messages transmitted successively by a tag 20 which is associated with an equipment EQ$_1$ producing a useful datum DATA$_1$. An interest is to verify for example a displacement pattern by the analysis of a sequence of positions determined successively for example from three beacons.

For example, the system and/or the method of the invention makes it possible to verify that the position of a tag and thus of the useful datum DATA$_1$ has persisted for a given lapse of time in a zone. It is also possible to verify that a movement has been made at a speed below a given threshold and/or has described a trajectory comprised within a given zone.

Unlocking of an Alarm

According to an embodiment, an anti-intrusion type alarm covering a perimeter defined by a surveillance zone is activated. This alarm may comprise a presence sensor, such as an optical sensor or a heat variation detector.

A system for managing the activation and the deactivation of the alarm is possibly ensured by an autonomous component or a server jointly located with the alarm or a remote server managing the alarm remotely. In this example, a deactivation code may be transmitted to deactivate the alarm. The management of the activation and the deactivation of the alarm are carried out by the acquisition of a digital control.

According to an exemplary embodiment, the deactivation code is automatically transmitted when a plurality of beacons 30 receives a message $M_1$ transmitted by a radio tag 20 situated in said zone. The zone covered by the alarm is preferentially comprised in the coverage zone of the beacons 30 of the invention. Thus, the method and the device of the invention make it possible to deactivate an alarm automatically by exploitation of the datum transmitted by the tag 20. The tag 20 is necessarily located in the detection zone since the messages $M_1$ are collected by the different beacons 30. The integrity of the deactivation code is thus indeed confirmed by the reception of the different received messages $M_1$ which attests that the person having the rights is indeed present in the premises. This embodiment shows that it is particularly difficult to corrupt such a code due to the fact that it is necessary to be actually located in the zone with the tag 20 to ensure the integrity of the transmitted code.

Exemplary Case of an Embodiment of a UWB Transmitter

According to an embodiment, the UWB tag 20 comprises a simplex communication module 21. "Simplex" is taken to mean that the communication module is suited only to transmit UWB messages but does not make it possible to receive UWB messages transmitted by other third party equipment.

According to an example, the simplex communication module 21 is for example in the form of an electric circuit comprising equipment such as an antenna, an amplifier, a local oscillator, a mixer, an analogue filter and any other equipment being able to contribute to the transmission of UWB signals.

According to an example, the simplex communication module 21 is configured to transmit the UWB messages in a frequency band centered on 4 gigahertz (GHz) and/or centered on 7.25 GHz. Nothing excludes however considering frequency bands centered on other frequencies.

The UWB messages, transmitted in the form of radioelectric signals, have at a given time an instantaneous frequency spectrum of predetermined width, for example comprised between 500 megahertz (MHz) and 2.5 GHz, which corresponds to radio pulses of durations comprised respectively between several nanoseconds and several tens of nanoseconds.

In an embodiment, the simplex communication module 21 is configured to transmit the UWB messages using an On Off Keying (OOK) radio pulse modulation of the bits to transmit, that is to say that the values of the bits to transmit are encoded by a presence or an absence of radio pulse. For example, if at a given time the bit to transmit is equal to "1" then the simplex communication module 21 transmits a radio pulse, whereas if the bit to transmit is equal to "0" said simplex communication module 21 does not transmit a radio pulse. Such arrangements are advantageous in that they make it possible to reduce the electrical consumption required to transmit a UWB message, since the transmission of bits to transmit with "0" consumes almost no electrical energy.

According to another embodiment, a radio Pulse Position Modulation (PPM) may be implemented in the method of the invention. For example, by considering that the bits to transmit in the form of radio pulses are rhythmed at a predetermined period Tc, then at each period Tc, the pulses are transmitted with a shift with respect to the period Tc, the value of said shift depending on the value of the bit to transmit.

According to an embodiment, each ultra-wide band radio pulse may be formed by multiplying a sinusoidal signal by a pulse envelope. In this case, the local oscillator forming the sinusoidal signal corresponding to the carrier frequency of the radio pulses may remain activated in a continuous manner throughout the duration of the UWB message, and the amplitude of said sinusoidal signal is modulated by said pulse envelope. Outside of the transmission times of the radio pulses, the amplitude of the sinusoidal signal is modulated by a signal of zero value.

The modulated signal obtained after amplitude modulation of the sinusoidal signal is next supplied at the input of the amplifier, which may also remain activated throughout the duration of the UWB message to transmit.

An advantage of this solution is to form in a more precise manner the sequence of ultra-wide band radio pulses, compared to transmitter devices according to the prior art in which the radio pulses are formed by supplying the sinusoidal signal directly at the input of the amplifier, and by activating the amplifier at the start of the transmission of a radio pulse and by deactivating said amplifier at the end of the transmission of said radio pulse. In these transmitter devices according to the prior art, the radio pulse envelopes are less precise, because they depend on the precision with which the activation/deactivation times of the amplifier may be controlled, the shape of the pulse envelope being furthermore difficult to control.

By modulating the sinusoidal signal by a pulse envelope before amplifying, the radio pulses are formed before the amplifier. Said amplifier thus no longer forms the radio pulses but restricts itself to amplifying said radio pulses formed beforehand. It is to be noted that it is however possible to deactivate the amplifier between radio pulses in order to reduce the electrical consumption of the amplifier.

According to an embodiment, the control module 22 comprises one or more processors and memorization means (magnetic hard disc, electronic memory, optical disc, etc.) in which is memorized a computer program product, in the form of a set of program code instructions to execute.

Alternatively, or as a complement, the control module 22 comprises one or more programmable logic circuits (FPGA, PLD, etc.), and/or one or more specialized integrated circuits (ASIC).

According to an embodiment, the control module 22 comprises a set of means configured in a software (specific computer program product) and/or hardware (FPGA, PLD, ASIC, discrete electronic components, etc.) manner.

The invention claimed is:

1. A method for controlling an integrity of at least one useful datum, comprising:
   acquiring at least one message by a plurality of beacons, a position of each of the plurality of beacons being known, each acquiring of the at least one message being carried out in a UWB (a Ultra-Wide Band) radio band, each of the at least one message received by each of the plurality of beacons coming from a UWB transmitter by wireless interface and a UWB demodulator, said UWB transmitter being physically linked to an equipment-and comprising a data link with said equipment;
   decoding the at least one useful datum by each of the plurality of beacons, said useful datum coming from said equipment and being designated as a first information;

determining a position information of the UWB transmitter, designated as a second information, from a calculation between different receptions of the at least one message transmitted by the UWB transmitter and received by each of the plurality of beacons;
generating a data pair comprising the first information and the second information;
verifying the integrity of said first information from an operation of controlling the second information;
transmitting a message for an activation of a service.

2. The method for controlling the integrity of the at least one useful datum according to claim 1, wherein the operation of controlling the determined position comprises:
controlling a coherency between each of the at least one message received by the plurality of beacons, the coherency corresponding to a difference in arrival times of said each message below a predefined threshold and/or;
carrying out a comparison between a position determined by trilateration and an expected position and/or;
controlling the first information by determining a similarity of at least one pattern of a data sequence received by each of the plurality of beacons.

3. The method for controlling the integrity of the at least one useful datum according to claim 1, wherein the acquisition comprises a reception of a sequence of radio pulses, defining UWB messages, by the plurality of beacons, each of the plurality of beacons being located at a predefined position.

4. The method for controlling the integrity of the at least one useful datum according to claim 3, wherein the position information of the UWB transmitter is determined by:
arrival times of UWB messages in order to deduce therefrom time-of-flight differences of the UWB messages and/or;
arrival powers of the UWB messages and/or;
arrival frequencies of the UWB messages,
at a level of said plurality of beacons.

5. The method for controlling the integrity of the at least one useful datum according to claim 4, wherein the location of the UWB transmitter is deduced from the trilateration calculation between the arrival times of the UWB messages by an estimation of the time-of-flight differences in arrival times of the UWB messages received by the plurality of beacons.

6. The method for controlling the integrity of the at least one useful datum according to claim 1, wherein at least one received UWB message of the UWB messages comprises an identifier of the UWB transmitter.

7. The method for controlling the integrity of the at least one useful datum according to claim 1, wherein a step of extraction of a data sequence from each of the received message is carried out, each of said extraction withdrawing data at same positions of each of the received message, said each of the extracted data sequence forming an ad hoc message identifier.

8. The method for controlling the integrity of the at least one useful datum according to claim 1, wherein the determined position information and the at least one useful datum, and optionally an identifier of the UWB transmitter, are associated through the generation of a unique key.

9. The method for controlling the integrity of the at least one useful datum according to claim 1, wherein the determined position information is compared to a position information deduced from a geolocation system by Wi-Fi, by IP address, by RFID or by GSM, a comparison between the determined position information and the position information deduced from the geolocation system evaluating a difference in distance vis-à-vis a predefined threshold, said method comprising a generation of a message $M_3$ of which a data field determines an authorization or not to a predefined service.

10. The method for controlling the integrity of the at least one useful datum according to claim 1, wherein the determined position information and the at least one useful datum are combined to generate a code resulting from an operation:
of encoding the data by an encoding algorithm;
of interleaving, a permutation of data or an operation making it possible to generate a data field comprising data bits of the position information and data bits originating from the at least one useful data, and/or;
of enciphering data with each other by means of an enciphering key.

11. The method for controlling the integrity of the at least one useful datum according to claim 1, further comprising transmission of a summary message to a remote server, the summary message comprising:
the at least one useful datum and the determined position information encoded in different fields of the summary message and/or;
the at least one useful datum and the determined position information, said determined position information being encrypted in the summary message and/or;
a unique key making it possible to decipher the position information enciphered in the field of the summary message and/or;
an identifier of the UWB transmitter having transmitted the at least one message and/or;
an identifier of an equipment on which a tag is arranged, said equipment and the tag forming the UWB transmitter.

12. The method for controlling the integrity of the at least one useful datum according to claim 1, further comprising the following preliminary steps:
collecting an amount of energy by radio channel by a transmitter device comprising a radio tag, said radio tag comprising a radio reception module for receiving a stream of radio waves;
transmitting the at least one message in the UWB radio band, said at least one message encoding the at one useful datum, said transmitting of the at least one message being generated from the amount of collected energy.

13. A control system for controlling an integrity of at least one useful datum comprising:
a plurality of reception beacons each comprising:
a first wireless interface configured to receive signals in a UWB (a Ultra-Wide Band) band;
a radio module adapted to process the signals received in such a way as to time stamp receptions of a plurality of messages received and to baseband demodulate the at least one useful datum;
a first calculator for determining a position information from an analysis of a plurality of properties originating from the receptions of messages of the plurality of messages received coming from at least one transmitter, said properties originating from the receptions being correlated in such a way as to determine a position information of the at least one transmitter;
a memory for saving at least one value associating a calculated position information of space and the at least one useful datum, a second calculator for verifying an integrity of first information from an operation of controlling second information.

14. The control system according to claim 13, wherein:
each beacon of the plurality of reception beacons comprises a component for time stamping the plurality of messages received;
the first calculator determines differences in times-of-flight originating from the plurality of receptions of the plurality of messages coming from the at least one transmitter in order to determine the position information of the at least one transmitter.

15. The control system according to claim 13, further comprising a remote server, said remote server comprising an interface for receiving a summary message generated by the first calculator and comprising calculation means to:
decode and control the position information and;
generate a message aiming to allow or forbid access to a service to a given equipment,
the remote server further comprising an interface for transmitting said message to the given equipment.

16. A transmitter device comprising:
an equipment adapted to generate at least one useful datum in a predefined context and transferring said at least one useful datum by a first interface;
a radio tag comprising a second interface for receiving said at least one useful datum, said radio tag comprising a UWB (a Ultra-Wide Band) modulator in a UWB band (a Ultra-Wide Band band) for transmitting a signal comprising said at least one useful datum, said radio tag further comprising:
a radio reception module for receiving a stream of radio waves;
a rectifier for converting a spectral power received by the radio reception module into an electric voltage or current;
an electrical accumulator;
an energy capacities management module for triggering a transmission of a message in the UWB radio band from the UWB modulator.

17. The transmitter device according to claim 16, further comprising an electrical supply link between the radio tag and the equipment, the energy capacities management module comprising a function for waking-up the equipment ensuring a delivery of a sufficient amount of energy to activate at least one measurement of at least one sensor of said equipment and transmission of at least one datum relative to said measurement to the tag.

18. The transmitter device according to claim 17, wherein the energy capacities management module comprises a function for optimizing energy collected to ensure at least:
the wake-up of the equipment,
the measurement of the sensor of the equipment and a transfer of the data from the equipment to the radio tag, and
a transmission of the UWB message by the radio tag.

19. The transmitter device according to claim 16, wherein the energy capacities management module comprises a self-learning function aiming to evaluate an amount of energy necessary for the equipment allowing it to accomplish a sequence of actions comprising at least a measurement of a physical parameter and its transmission to the radio tag from a data link.

20. The transmitter device according to claim 16, wherein the radio tag comprises a module for managing the surveillance of the availability of at least one function ensured by the equipment, said module controlling at regular intervals a reception of a signal or a datum presenting an indicator of activity of said equipment.

21. A system for controlling an integrity of at least one useful datum-produced by a device according to claim 16.

* * * * *

UNITED STATES PATENT AND TRADEMARK OFFICE
CERTIFICATE OF CORRECTION

PATENT NO. : 11,609,298 B2
APPLICATION NO. : 17/260416
DATED : March 21, 2023
INVENTOR(S) : Luc Antolinos It is certified that error appears in the above-identified patent and that said Letters Patent is hereby corrected as shown below:

On the Title Page

Item (54) and in the Specification, Column 1, Lines 1-3, Please correct the title as follows:
CONTROL SYSTEM, A TRANSMITTER DEVICE AND METHOD COMPRISING UWB INTERFACE FOR LOCATING DATA Signed and Sealed this
Ninth Day of May, 2023

Katherine Kelly Vidal
*Director of the United States Patent and Trademark Office*